Aug. 4, 1964
B. J. ARNETT
3,142,948
CARTON LOADING APPARATUS
Filed Oct. 31, 1961
4 Sheets-Sheet 4
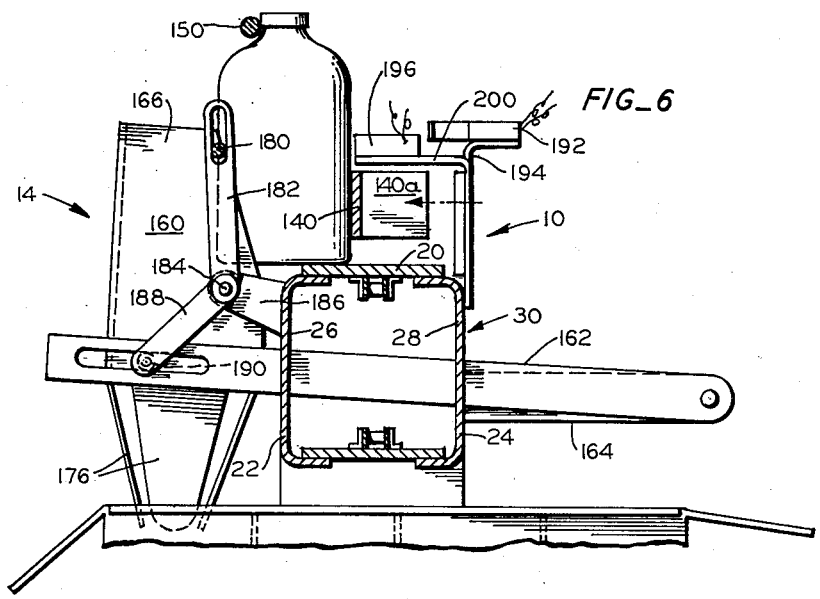
FIG_6
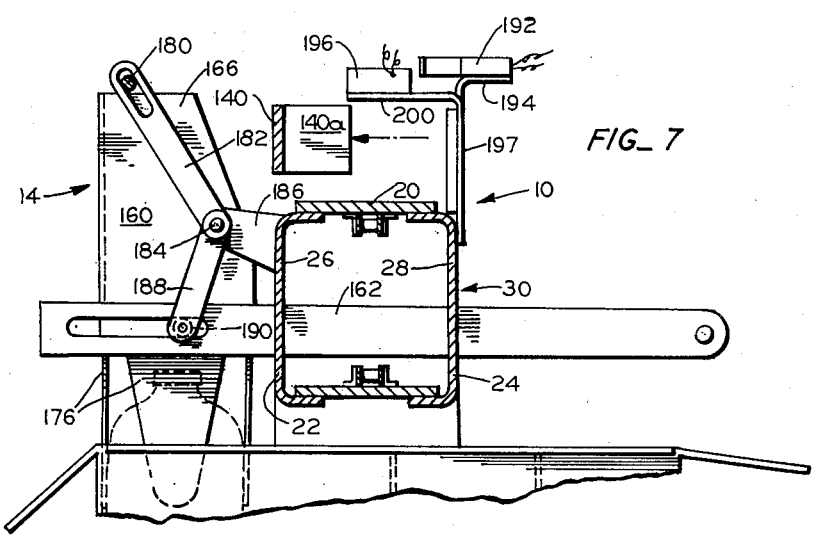
FIG_7
INVENTOR.
BOYD J. ARNETT
BY
Paul B. Fihe
PATENT AGENT

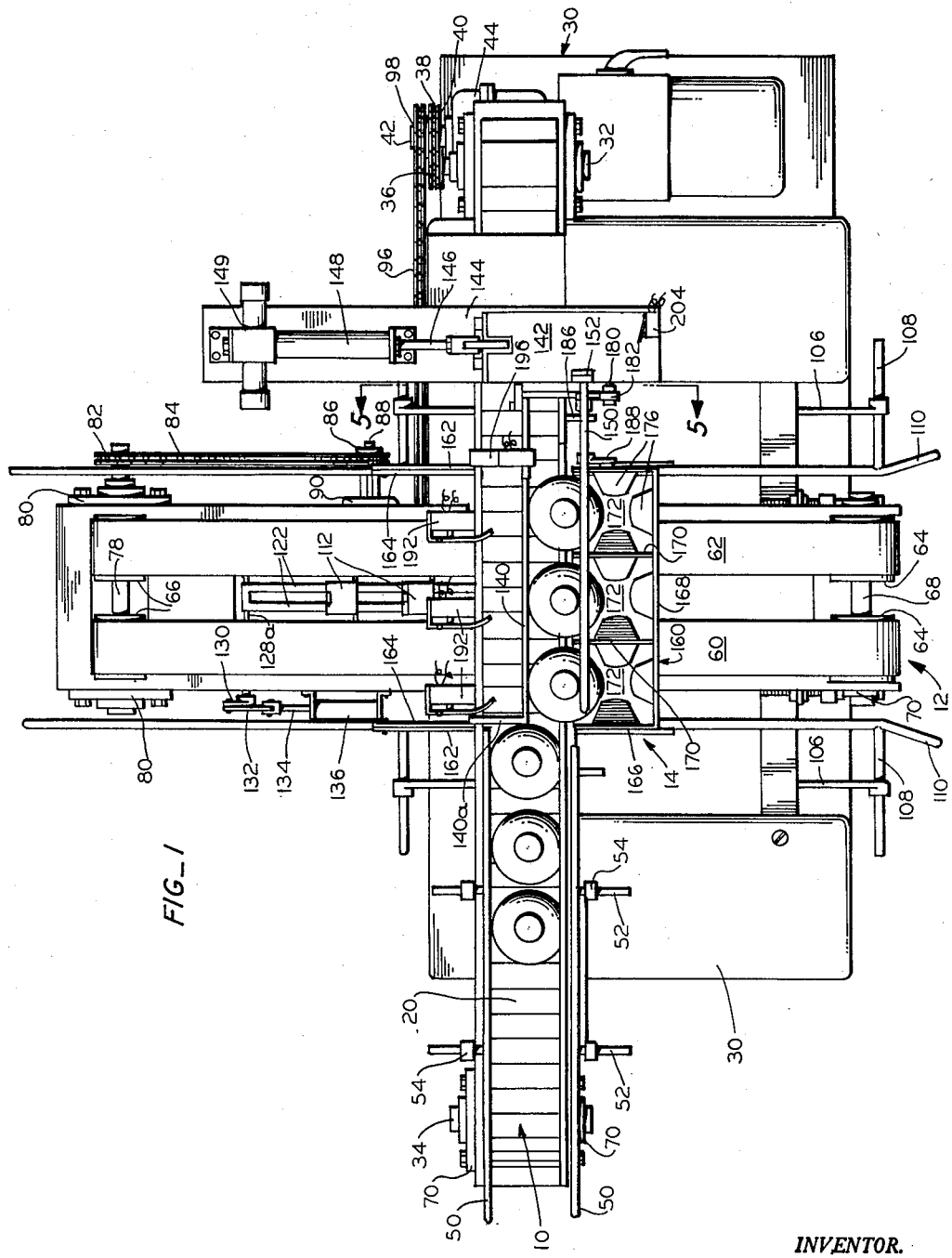

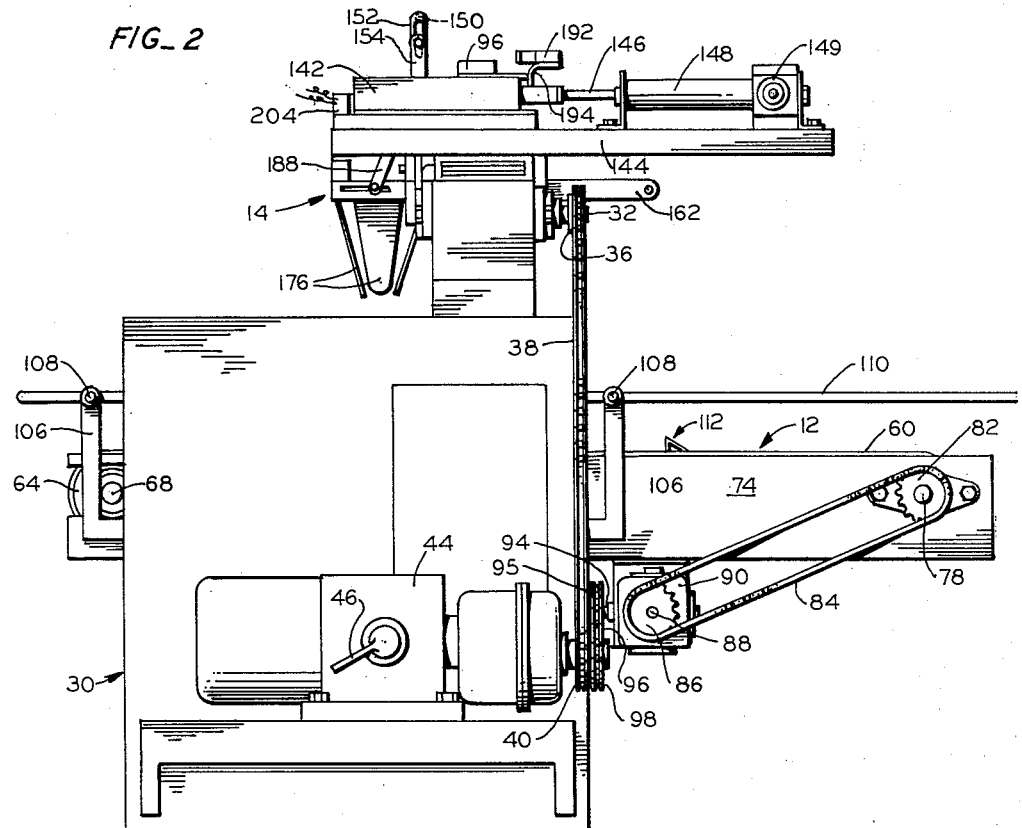
FIG_2
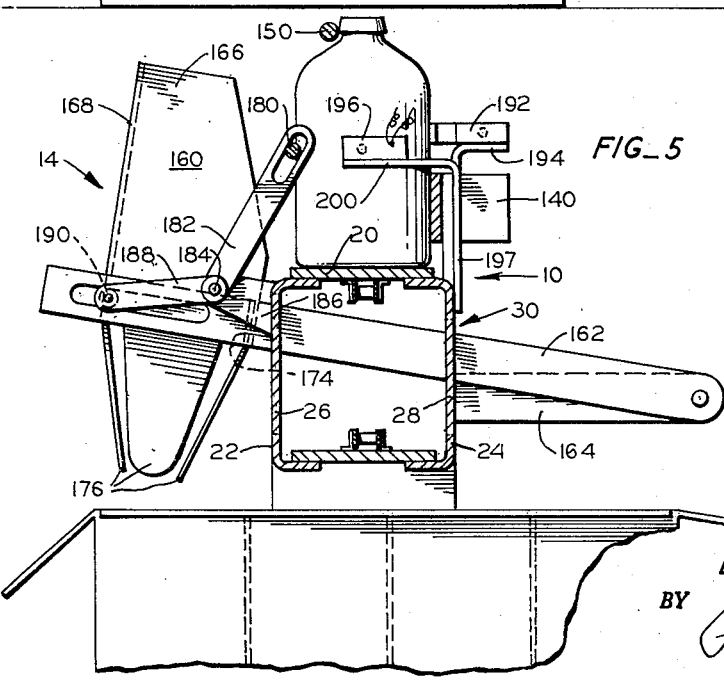
FIG_5
INVENTOR.
BOYD J. ARNETT
BY
Paul B. Fike
PATENT AGENT

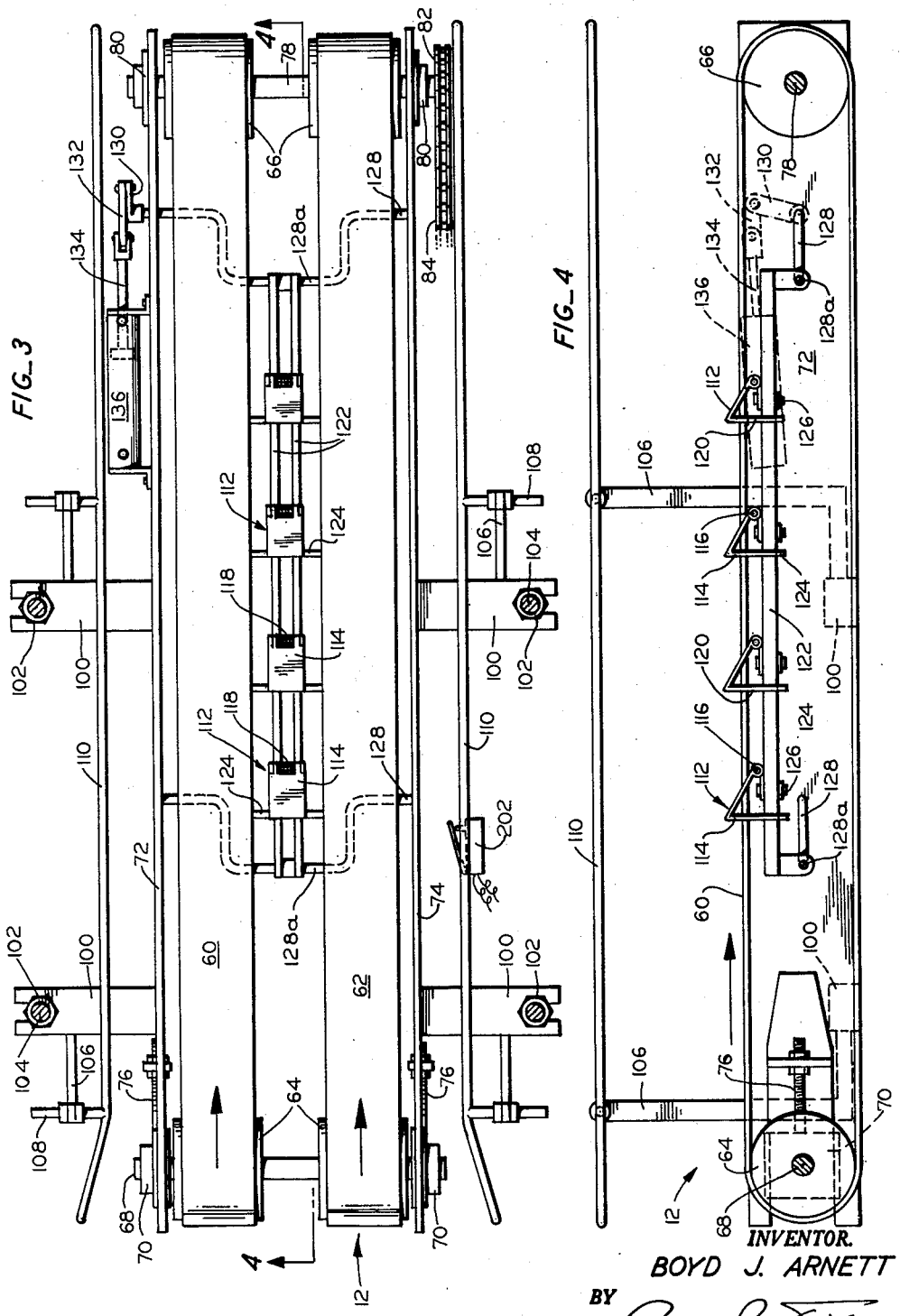

United States Patent Office 3,142,948
Patented Aug. 4, 1964

3,142,948
CARTON LOADING APPARATUS
Boyd J. Arnett, 1914 Monroe St., Santa Clara, Calif.
Filed Oct. 31, 1961, Ser. No. 149,078
10 Claims. (Cl. 53—55)

The present invention relates to carton loading apparatus, and more particularly, to apparatus for gravity or drop-loading of bottles, cans, or other articles into cartons.

For shipping purposes, bottles, cans and many other articles are closely packed into cartons. It will be immediately apparent that the articles, whether inserted manually or by carton loading apparatus, must be introduced into the carton with precision if the desired close, regular spacing is to be achieved. Some automatic apparatus has been developed in an effort to overcome the tedium and the time consumption of manual loading operations; but presently available carton loading apparatus represents at best a compromise between the requirement for high speed loading operations and the requirement for careful loading of the articles so that jamming, tearing of labels, destruction of cartons, and so forth are avoided. In the particular case of glass bottles, the dilemma is exaggerated in that the bottles are subject, of course, to breakage, and furthermore, are normally loaded into cartons with honeycomb inserts which form individual cells for the bottles, such cellular construction necessitating even greater precision in the insertion of the bottle into the carton. Thus, ultimately, although several different carton loading devices have been developed and put into use, none have been capable of loading articles, and particularly bottles, into cartons at a rate commensurate with the rates obtainable by bottle filling machines so that the full capabilities of the latter have not been practically exploited.

It is accordingly a general object of the present invention to provide a carton loading apparatus that is capable of loading articles and particularly frangible bottles at a relatively high rate of speed but in a precise, careful fashion so that bottle breakage, jamming and carton damage are effectively avoided.

It is a feature of the invention to provide a carton loading apparatus that receives bottles or other articles in single file relation which is the normal fashion that the articles are discharged from conventional filling and capping apparatus, wherefore the present carton loading apparatus is readily adapted for use with such filling and capping apparatus.

Additionally, it is a feature of the present invention to provide a carton loading apparatus that is extremely simple in its operating principle in that the bottles or other articles are merely dropped into place in an empty carton, yet which accomplishes such drop-loading in a precise and controlled fashion so as to ultimately obtain a requisite tight packing of the bottles or other articles within the carton.

More particularly, it is a feature of the invention to provide a carton loading apparatus which incorporates control mechanisms that enable instigation of article movement or transfer into the carton only when the requisite number of articles and the empty carton are appropriately positioned to insure a proper loading cycle.

Yet more particularly, it is a feature of the invention to provide a carton loading apparatus that incorporates mechanism which maintains control of the bottle or other article during its transfer so that it enters the carton at the proper place and time, and also in the proper disposition.

Another feature of the invention is to provide a carton loading apparatus incorporating article guide means which moves into the interior of the carton during transfer of articles thereinto so as to render their placement and disposition in the carton under continuous guided control until the very moment that the articles come to rest in the carton.

A related feature of the invention is to provide carton loading apparatus wherein the article guide mechanism serves also, in those cases where partitions are present within the carton, to engage and, if necessary, laterally deflect such partitions sufficiently to enable entry of the bottle or other article into each cell of the partitioned carton.

Yet another feature of the invention is to provide a carton loading apparatus that provides for continuous conveyance of the cartons with but momentary interruption during each loading cycle.

It is yet a further feature of the invention to provide a carton loading apparatus which is adapted for the handling of cartons of various sizes and for bottles or other articles of various sizes and shapes and which moreover is designed so that adjustment for various shapes and sizes of cartons and/or articles to be loaded can be made easily and quickly.

These as well as other objects and features of the invention will become more apparent from a perusal of the following description of the structure illustrated in the accompanying drawings wherein:

FIG. 1 is a top plan view of a carton loading apparatus constituting an embodiment of the present invention, FIG. 2 is a side elevational view of the apparatus as viewed from the right of FIG. 1, FIG. 3 is an enlarged top plan view of the carton conveyor, FIG. 4 is a sectional view taken along line 4—4 of FIG. 3, and FIGS. 5 and 6 and 7 are enlarged fragmentary sectional views taken substantially along line 5—5 in FIG. 1 and illustrating successive stages in the transfer of an article into a carton.

Generally, in accordance with the present invention, a carton loading apparatus includes an article conveyor 10 that is adapted to receive and frictionally propel articles in single file relation along a generally horizontal path to a transfer position. Disposed below and extending transversely of said article conveyor 10 is a carton conveyor 12 that is adapted to frictionally propel empty open cartons in upright disposition underneath the article conveyor so that a transfer mechanism, generally indicated at 14, can be cyclically actuated to laterally displace accumulated articles at the transfer position from the article conveyor so that they may drop into the carton thereunder. As will become apparent hereinafter, each transfer cycle is instigated in response to the accumulation of a predetermined number of articles at the transfer position on the article conveyor, and in response to the presence of a carton in appropriate article receiving position on the carton conveyor thereunder.

More particularly, the article conveyor 10 is formed by an endless, flat-top conveyor chain 20 whose upper flight slidably rests at its lateral edges on the inturned upper flanges of facing U-channel members 22, 24 (see FIG. 5) that extend in substantially parallel horizontal bridging relationship between the upwardly projecting side portions 26, 28 of a generally U-shaped main frame 30. The lower return flight of the flat top conveyor chain rests slidably on the inturned lower flanges of the channel members 22, 24 and suitable chain sprockets (not shown) are mounted at opposite extremities of the U-channel members to support the chain for movement. The chain mounting sprockets are mounted on transverse shafts 32, 34 that are supported by suitable bearings for rotation at the opposite extremities of the mounting U-channel members 22, 24 and the one shaft 32 carries at its outer end a drive sprocket 36 which accommodates a conventional drive chain 38 that extends downwardly and is trained about one sprocket 40 on the projecting output shaft 42 of a variable speed drive unit 44 suitably supported on the frame 30 and having a handle 46 thereon to enable speed variation of the article conveyor 10. The drive arrangement is such that the upper flight of the conveyor 10 moves in a direction from the left to the right, as viewed in FIG. 1, so as to bring bottles received from the left of the apparatus to the transfer position over the aforementioned carton conveyor 12.

In order to guide bottles or other articles that are frictionally propelled by the article conveyor 10, side rails 50 are positioned above and at each side of the conveyor chain and are preferably supported for lateral adjustment by means of mounting rods 52 that project horizontally outwardly to pass through suitable bores in mounting brackets 54 secured to the sides of the previously described U-channel members 22, 24. Thus the conveyor 10 can accommodate bottles or other articles of varied dimensions and a simple adjustment of the side rails 50 will assure the controlled single file progression of the articles toward the transfer position over the carton conveyor 12. As shown, the described side rails 50 terminate short of such transfer position.

The aforementioned carton conveyor 12 is mounted on the base of the U-shaped main frame 30 so as to extend transversely relative to the article conveyor 10 and pass thereunder at the transfer position so that articles, laterally displaced from the article conveyor, can drop into an empty carton on the carton conveyor.

With continued reference to FIGS. 1 and 2, and additional reference to FIGS. 3 and 4, the carton conveyor 12 includes a pair of endless conveyor belts 60, 62 composed of roughened rubber or other friction-producing material. The belts 60, 62 are mounted in spaced, parallel relation on supporting drums or rollers 64, 66, the adjacent rollers at one end of the carton conveyor being mounted on a transverse idler shaft 68 carried by bearings 70 adjustably mounted in respective side plates 72, 74 of the conveyor frame. More specifically, adjustment of the bearings 70 and the shaft 68 and rollers 64 supported thereby is obtained through use of appropriate adjustment screws 76 that extend generally longitudinally of the side plates 72, 74, wherefore turning of such screws enables application of proper tension to the endless belts 60, 62 in a well known fashion.

The adjacent rollers 66 at the opposite extremity of the conveyor are mounted on another transverse shaft 78 also supported in bearings 80 that are mounted in a fixed position on the longitudinally-extending side plates 72, 74 of the conveyor frame and the projecting end of this shaft carries a sprocket 82 through which drive connection to the carton conveyor 12 may be established. With particular reference to FIGS. 1 and 2, a sprocket chain 84 is trained about such sprocket 82 and about the sprocket 86 on the output shaft 88 of a speed reduction unit 90 whose input shaft 94, in turn, carries a sprocket 95 that is connected by another laterally-extending sprocket chain 96 to a second drive sprocket 98 on the described output shaft 42 of the variable speed drive unit 44. Thus, the linear motion of the carton conveyor 12 will be correlated with that of the article conveyor 10. When energized by the drive unit 44, the carton conveyor 12 moves from the bottom to the top of FIG. 1 or from the left to the right, as viewed in FIGS. 2, 3, and 4.

In order to mount the carton conveyor, two ears 100 are rigidly mounted to project laterally from each of the described side plates 72, 74, and each ear 100 carries a fixed nut 102 that receives a respective one of four threaded rods 104 which are rotatably supported on and project upwardly from the base of the U-shaped frame 30. Thus, when the level of the carton conveyor 12 must be changed to accommodate a particular size of carton, mere rotation of the threaded mounting rods 104 enables such level to be quickly attained. The mounting ears 100 also carry upwardly extending brackets 106, each of which is provided with a lateral bore at its upper extremity to slidably receive a rod 108 rigidly mounting at its inner extremity one of a pair of guide rails 110 which serve to maintain the carton in appropriate aligned position on the conveyor 12 during its advance. Thus, ready adjustment can be made for cartons of various widths and depths.

When the carton conveyor 12, as described, is energized by the drive unit 44, cartons will be advanced by the frictional propulsion of the belts 60, 62, and in accordance with one aspect of the present invention, such advance is momentarily stopped during each transfer or loading cycle. To provide such intermittent stopping of the cartons, a plurality of longitudinally-spaced stops 112 are mounted to project upwardly between the spaced belts 60, 62 so that one or another of such stops engages the leading end of the carton to temporarily impede its motion. As shown best in FIGS. 3 and 4, each of the stops 112 constitutes a small plate 114 that is pivotally mounted on a transverse pivot pin 116 positioned below the upper surface of the belts 60, 62. A coil spring 118 is connected torsionally between such pin 116 and the plate 114 so as to urge the latter into an upward, inclining disposition in a direction opposed to the direction of carton motion so that the free extremity of the plate normally lies a predetermined distance above the surface of the belts as illustrated most clearly in FIG. 4. A leg 120 depends from the free extremity of the plate 114 so as to serve as a flat, abutting surface adapted for impeding engagement with the front end of an advancing carton and projects downwardly between parallel rods 122 extending longitudinally of the conveyor 12 and between the belts 60, 62. At its lower end the leg 120 carries a laterally projecting foot 124 which engages the undersurface of the rods 122 to limit the spring-urged upward movement of the stops 112. The described pivot pin 116 is adjustably secured on the rods 122 by a nut 126 which enables the entire stop 112 to be adjusted longitudinally of such mounting rods in order to accommodate cartons of various lengths.

The longitudinal mounting rods 122 extend generally horizontally and are pivotally supported at their opposite extremities on the central, displaced portions 128a of crank members 128 whose lateral projecting extremities are mounted for rotation in the side plates 72, 74 of the carton conveyor 12. When the rotatably-supported cranks 128 are rotated in a counterclockwise direction, as viewed in FIG. 4, the stop-mounting rods 122 and the stops 112 carried thereby are moved in an arcuate path downwardly to a position where the upwardly-projecting ends of the stops 112 lie beneath the upper surface of the conveyor belts 60, 62 wherefore carton advance is unimpeded.

In order to actuate withdrawal of the stops 112 from carton impeding position, an arm 130 is fixed to the projecting end of one crank member 128 and projects upwardly therefrom for pivoted connection to a link 132 whose other end is pivotally connected to the ram 134 of a hydraulic cylinder 136 mounted on the side plate 72. Normally the ram 134 resides in the position illustrated in FIGS. 3 and 4, but upon suitable hydraulic actuation under control of a solenoid valve 135, the ram 134 is moved to the left, to thus, through the described linkage, rotate the crank members 128 in a counterclockwise direction and effect withdrawal of the stops 112 from carton impeding position. After a carton has been released by momentary actuation of the cylinder 136, it will be advanced by the conveyor belts 60, 62 over the first stop 112, and thereafter, will come into engagement with the second stop 112 as the hydraulic actuating mechanism reassumes the position illustrated in FIGS. 3 and 4. The passed-over first stop 112 will be depressed by the weight of the carton thereover, the spring mounting accommodating such stop depression, wherefore, this first stop will no longer interfere with the progression of the carton passing thereover and will only function again when a succeeding carton is encountered.

During the interval when a carton is stopped on the carton conveyor 12, the mentioned transfer mechanism 14 is actuated to deliver an appropriate number of articles thereinto. More particularly, such transfer mechanism 14 includes a pusher plate 140 that is supported for lateral movement across the article conveyor 10 at the transfer position so as to displace articles from the article conveyor so that they may subsequently drop into the underlying carton. This pusher plate 140 is mounted at its one end on a carriage 142 that is slidably supported on a platform 144 fixedly mounted so as to extend over the article conveyor chain 20 at a position adjacent the transfer position. To effect reciprocatory movement of the carriage 142 and the pusher plate 140 mounted thereon, a ram 146 projecting from a hydraulic cylinder 148 is connected to the carriage and is positively energized to move in one direction or the other by a conventional solenoid control valve 149. When the ram 146 is fully retracted within the cylinder 148, the pusher plate 140 is in its inoperative position where it extends along one side of the article conveyor chain 20 so as, in effect, to form an extension of one of the previously described side rails 50. When the hydraulic cylinder 148 is actuated so as to project the ram 146 therefrom, the carriage 142 is moved on its supporting platform 144, the stroke of the ram being sufficient to cause movement of the pusher plate 140 entirely across the width of the article conveyor chain 20 to thus sweep any articles entirely off the conveyor. A rectangularly disposed flange 140a at the free end of the pusher plate 140 is brought, during such movement of the pusher plate across the article conveyor, into article blocking position so that succeeding bottles or other articles frictionally propelled by the conveyor chain 20 will be held against further advance until the pusher plate 140 is returned to its inoperative position at the side of the article conveyor 10.

To assure that the bottles or other articles displaced by the pusher plate 140 remain in substantially a vertical disposition as they are swept off the article conveyor 10, a stabilizing rod 150 is supported to engage the upper portion of the articles on the side remote from that engaged by the pusher plate and to maintain such engagement until the descent or drop of the articles into the underlying carton has occurred. Thus, as shown best in FIGS. 1 and 2, this stabilizing rod 150 is mounted to project laterally from the upper end of the arm 152 that is adjustably secured by slotted connection to a second arm 154 which is fixed to the carriage 142 and rises substantially vertically therefrom. Thus, as the pusher plate 140 is moved forwardly across the article conveyor 10, the stabilizing rod 150 is similarly moved so as to retain its position relative to the pusher plate. When different articles are being handled, obviously the position of the stabilizing rod 150 can be adjusted to effect properly its stabilizing function.

In addition to the described means for displacing the articles laterally from the article conveyor, the transfer mechanism 14 includes means for guiding the articles during their vertical drop into the underlying carton, thus to assure proper controlled entry into the carton or, more particularly, the individual cells formed therewithin. Such article-guide means includes a guide member 160 supported adjacent the side of the article conveyor 10 remote from the pusher plate 140 when in its inoperative position. Such guide member 160 is removably supported on and between the free ends of parallel rods 162 that extend through slots in the article conveyor supporting guide channels 22, 24 for pivotal connection to like brackets 164 supported by and projecting from the channel members. Obviously, such removable support on the pivoted rods 162 is required so that a different guide member 160 may be placed thereon when articles of different size or shape are to be handled by the mechanism. As specifically shown in the drawings, the guide member 160 is dimensioned to accommodate three bottles for transfer into an underlying carton having a group of three cellular units to accommodate this size and shape bottle. Thus, as illustrated, the guide member 160 includes side plates 166 through which its support on the pivoted rods is established and an end plate 168 joining the extremities of the side plates remote from the article conveyor, the other end of the guide member 160 being left open to enable reception of the bottles laterally displaced from the article conveyor 10. Two rigid partitions 170 are joined to the end plate 168 so that in effect three vertically-disposed guide channels 172 are provided in the guide member, each channel being of appropriate dimensions to accommodate slidably an individual bottle. Below the lateral opening in the guide member 160, a rigid brace 174 connects the side plates 166 so that the entire upper portion of the guide member 160 is a relatively rigid structure. The lower portion of the guide member is formed by three groups of spring fingers 176, each group being positioned below one of the guide channels 172 to form an extension thereof in a fashion such that the drop of the bottles is frictionally impeded. More particularly, each of the spring fingers 176 is suspended from the rigid upper portion of the guide member to extend slightly inwardly so that, in effect, a restricted opening at the lower end of each guide channel 172 is formed, but which opening may under the force of a descending bottle temporarily open to permit its passage therethrough. The size and strength of such spring fingers 176 is related to the weight and shape of the bottle or other article to be handled thereby to assure completion of its descent through the guide channel 172 but sufficiently slowly to avoid any possibility of breakage. Preferably, the fingers 176 are formed by flat sheet material so that no harmful scraping of the bottle or a label thereon is experienced.

To further insure the precision of transfer into the cells of an underlying carton, the guide member 160 is arranged to move on its supporting pivoted rods 162 downwardly upon the occasion of each transfer operation so that the described spring fingers 176 enter the respective cells in the underlying carton prior to the time that a bottle is dropped therethrough. To assure that such vertical movement of the guide member 160 is accomplished in timed relation with the displacement of the bottles from the article conveyor 10, a short rod 180 is rigidly mounted on the pusher plate carriage 142 to project laterally therefrom and enter a slot in the upper end of a lever arm 182 whose lower end is secured to a shaft 184 rotatably mounted in a bracket 186 projecting from the side of the article conveyor supporting channel members 22, 24. To the other end of this shaft 184 is secured a second lever arm 188 whose free end carries a laterally projecting pin 190 that extends through a longitudinal slot in one of the described pivoted rods 162 which carry the guide member 160. The arrangement is such that the downward movement of the guide member 160 is correlated with the lateral movement and subsequent vertical descent of the bottles, as illustrated in FIGS. 5, 6 and 7. As the carriage 142 is actuated to move the pusher plate 140 forwardly, the laterally projecting rod 180 thereon through the described linkage initiates rotation of the lever arm shaft 184 in a counterclockwise direction to thus lower the guide member 160 until the spring fingers 176 enter the cell of an underlying carton. As can be seen by specific reference to FIG. 6, such entry of the fingers into the carton occurs prior to complete displacement of the bottle from the article conveyor 10 and when, as shown in FIG. 7, the bottle has dropped into the respective channel of the guide member 160, it drops and forces open the spring fingers 176 into engagement with the adjoining partitions within the carton as the bottle descends. Thus, if one partition in the carton were incorrectly positioned (e.g. it had been accidentally bent), the spring fingers 176, through their lateral movement as the bottle passes downwardly, will automatically return such bent or displaced partition into the required article receiving disposition.

After three bottles have been dropped into the carton and the pusher plate 140 starts to retract, the guide member 160, in turn, is pulled upwardly, the spring fingers 176 being able to slip between the encompassed bottle and the surrounding carton partitions so that ultimately the guide member will be returned to its initial bottle receiving position at the same time that the pusher plate is returned to its inoperative disposition at the side of the article conveyor 10.

In accordance with an additional aspect of the present invention, means are provided to automatically instigate a transfer cycle when and only when a receiving carton and the desired number of articles are positioned at the transfer position. For this purpose three microswitches 192 are supported by suitable brackets 194 at the side of the article conveyor 10 so that the resilient actuating arms thereof project a short distance into the path of the bottles or other articles progressing to the transfer position, and a fourth microswitch 196 is positioned on a suitable supporting bracket 197 over the center of the article conveyor 10 on an article stop member 200. Thus, these four switches 192, 196 are only closed when three bottles have arrived in abutting relationship adjacent the pusher plate 140; whereupon they are ready for the transfer operation. A fifth microswitch 202 is mounted on the carton guide rail 110 at a position laterally adjacent the first stop member 112 so that its actuating arm will be engaged to close the switch only when a carton is resting against one or another of the series of stops. The five microswitches 192, 196, 202 all are connected in a series circuit with a suitable source of potential (not shown) and the mentioned solenoid valve 149 which actuates article-displacing movement of the hydraulic ram 146. Thus, only when three bottles and a carton are appropriately positioned to enable proper transfer of articles from the conveyor into the carton, will all of the switches 192, 196, 202 be closed to energize the solenoid and instigate the transfer of the bottles into the underlying carton. Once this circuit has been closed to energize the transfer cycle, a suitable holding circuit is incorporated to maintain movement of the pusher plate 140 and the associated guide member 160 until such circuit is de-energized by a sixth microswitch 204 whose actuating arm is positioned in the path of the carriage 142 actuated by the hydraulic ram 146, such switch being positioned so as to be engaged by the carriage only when the transfer operation has been completed. This sixth microswitch 204 opens the electrical circuit to thus de-energize the solenoid valve 149 associated with the hydraulic ram 146 so as to reverse the hydraulic connection and return the pusher plate 140 to its inoperative position and the guide member 160 to its upper article receiving position. While engaged momentarily at the end of the stroke of the hydraulic ram, this sixth microswitch 204 also effects de-energization of the described solenoid valve 135, as shown in FIG. 3, so that the hydraulic ram 134 removes the stops 112 from carton impeding position. Such de-energization is only momentary, effecting a withdrawal of the stops 112 for a very short interval, whereupon they are once again returned to their upwardly projecting carton-blocking positions. The carton is thus permitted to advance to the next stop in the series wherefore it is almost immediately brought into a position of readiness for reception of a successive group of bottles in the next row or group of cells therewithin.

In turn, the microswitches 192, 196 adjacent the article conveyor 10 are all closed as soon as a new group of three bottles have arrived at the transfer position; wherefore it will be seen that each transfer cycle is actuated by the presence of the articles and the carton so that no delay other than that necessitated by the actual absence of carton or bottles is experienced.

Obviously, various modifications and/or alterations can be made to the described structure without departing from the spirit of the invention; and the foregoing description of one embodiment is accordingly to be considered as purely exemplary and not in a limiting sense. The actual scope of the invention is to be indicated by reference to the appended claims.

What is claimed is:

1. Carton loading apparatus which comprises an article conveyor arranged to frictionally propel the articles in single file relation along a predetermined path, a continuously-moving carton conveyor arranged to frictionally propel cartons along a path below the article path on said article conveyor and transversely thereof, means mounted for movement into the path of cartons on said carton conveyor for intermittently stopping motion of the carton on said carton conveyor with one carton in article-receiving position, means movable across said article conveyor to displace articles laterally therefrom at a position thereon above said transversely-disposed carton conveyor whereby the displaced articles can drop into a carton thereunder, and means operative in response to the accumulation of articles in abutting relation adjacent said article-displacing means and the presence of a carton on said carton conveyor thereunder for actuating movement of said article-displacing means.

2. Carton loading apparatus according to claim 1 which comprises means operative in response to predetermined movement of said article-displacing means for releasing said carton stopping means.

3. Carton loading apparatus which comprises an article conveyor arranged to frictionally propel the articles along a predetermined path to a transfer position, means for sensing a full complement of articles at such transfer position, a carton conveyor arranged to propel cartons along a path under such article transfer position, movable means for transferring articles at such transfer position into a carton thereunder, means projecting into said carton path for sensing the presence of a carton moved by said carton conveyor into article-receiving position, and means for actuating movement of said article-transfer means in response to the sensed presence of a full complement of articles at such transfer position and the sensed presence of a carton thereunder.

4. Carton loading apparatus which comprises an article conveyor arranged to frictionally propel articles in upright disposition along a predetermined path to a transfer position, means on both sides of such path for laterally engaging articles at such transfer position to maintain the upright disposition thereof, means for engaging articles at such transfer position to preclude further advance thereof, means for effecting relative lateral displacement between the articles and the frictional support therefor at such transfer position so as to permit the articles to drop by gravity with said lateral-engaging means maintaining the articles in their upright disposition during such lateral displacement, and means for moving an empty carton into article-receiving position below such article transfer position so as to receive dropped articles in their upright dispositions.

5. Carton loading apparatus which comprises an article conveyor arranged to frictionally propel the articles in single-file relation along a predetermined path, a carton conveyor arranged to frictionally propel cartons along a path below the article path on said article conveyor and transversely thereof, means for intermittently stopping motion of the cartons, means movable across said article conveyor to displace a predetermined number of articles at a position thereon above said transversely disposed carton conveyor whereby a row of displaced articles can drop into a carton thereunder, and means operatively connected to said article displacing means for movement downwardly for guiding the articles into the carton, said operative connection being such that downward movement of said article-guiding means is instigated simultaneously with movement of said article displacing means.

6. Carton loading apparatus according to claim 5 wherein said article-guiding means is substantially vertically movable downwardly an amount such as to enter the interior of the carton prior to complete displacement of the articles from said article conveyor.

7. Carton loading apparatus according to claim 6 wherein said article guiding means is pivotally supported for movement and includes a replaceable guide member for accommodation of various sized articles.

8. Carton loading apparatus according to claim 6 wherein said article guiding means includes four spring fingers angularly disposed to frictionally resist descent of the articles therebetween and movable into engagement with adjacent partitions in a carton during passage of an article therebetween.

9. Carton loading apparatus which comprises an article conveyor arranged to frictionally propel the articles in single file relation along a predetermined path towards a transfer position, means for sensing each of a full complement of articles at such transfer position, a carton conveyor arranged to propel cartons along a path below the article path at such transfer position, means for transferring articles at the transfer position from said article conveyor into a carton on said carton conveyor, and means for actuating said article transferring means only in response to the presence of a full complement of abutting articles at the transfer position on said article conveyor and a carton in article-receiving position on said carton conveyor.

10. Carton loading apparatus according to claim 9 wherein said article transfer means includes a pusher plate arranged to engage the articles on one side and a stabilizing rod operatively connected to said pusher plate for movement therewith and arranged to engage the articles on the other side to maintain an upright disposition thereof during their transfer.

References Cited in the file of this patent
UNITED STATES PATENTS

| | | |
|---|---|---|
| 1,405,102 | Couk | Jan. 31, 1922 |
| 2,236,945 | Gibbs | Apr. 1, 1941 |
| 2,746,662 | Thompson et al. | May 22, 1956 |
| 2,819,576 | Hendricks et al. | Jan. 14, 1958 |
| 2,952,955 | Leichenich | Sept. 20, 1960 |